United States Patent [19]

Dancer

[11] Patent Number: 5,755,057
[45] Date of Patent: May 26, 1998

US005755057A

[54] FISHING ACCESSORY CONTAINER

[76] Inventor: Kirk Dancer, 3608 Agnes, #D, Dallas, Tex. 75210

[21] Appl. No.: 635,203

[22] Filed: Apr. 17, 1996

[51] Int. Cl.$^6$ .................................................. A01K 97/00
[52] U.S. Cl. ......................................... 43/54.1; 206/315.11
[58] Field of Search ................................. 43/54.1, 57.1;
206/315.11; 220/735, 4.27, 521

[56] References Cited

U.S. PATENT DOCUMENTS

| | | | |
|---|---|---|---|
| 1,576,688 | 3/1926 | Thompson | 43/54.1 |
| 2,264,744 | 12/1941 | Dunnam | 43/54.1 |
| 3,751,845 | 8/1973 | van Leeuwen | 43/54.1 |
| 4,128,170 | 12/1978 | Elliott | 206/315.11 |
| 4,353,182 | 10/1982 | Junkas | 43/54.1 |
| 4,759,148 | 7/1988 | Love | 43/54.1 |
| 4,845,881 | 7/1989 | Ward | 43/54.1 |
| 5,125,183 | 6/1992 | Tisdell | 43/54.1 |
| 5,261,561 | 11/1993 | Hodges, Jr. | 220/735 |
| 5,305,544 | 4/1994 | Testa | 206/315.11 |
| 5,319,877 | 6/1994 | Hagan | 43/54.1 |
| 5,337,892 | 8/1994 | Zaffina | 43/54.1 |
| 5,542,206 | 8/1996 | Lisch | 206/315.11 |

*Primary Examiner*—Kurt Rowan

*Attorney, Agent, or Firm*—Joseph N. Breaux

[57] ABSTRACT

A fishing accessory container including an insulated bucket having an insulated compartment, a carrying handle, a spigot aperture formed through a bucket sidewall providing a passage into the insulated compartment; first and second stackable tackle trays adapted to seat on the rim top section of the insulated bucket; a liquid vessel defining a liquid containment compartment accessible through a fill opening and in fluid communication with a spigot receiving fitting that is positioned on a vessel sidewall in a manner to allow the spigot receiving aperture to be placed in registration with the spigot aperture of the insulated bucket; a liquid vessel cap securable over the fill opening of the liquid vessel; a spigot mechanism having a insertion end adapted to pass through the spigot aperture and sealingly fit within the spigot receiving fitting of the liquid vessel in a manner to establish a fluid pathway from the liquid vessel through the spigot mechanism and a sealing plug adapted to sealingly engage a perimeter edge of the spigot aperture in a manner to seal the spigot aperture when the when the insertion end is sealing fit within the spigot receiving fitting; and a lid assembly including a lid member that can be snap fit over the insulated bucket rim and the first and second tackle trays, and a cushion positionable atop the lid member.

15 Claims, 2 Drawing Sheets

5,755,057

FISHING ACCESSORY CONTAINER

TECHNICAL FIELD

The present invention relates to fishing accessories and more particularly to a portable carryall container that functions as a stool, a cooler, a water dispenser, and a tackle box.

BACKGROUND ART

Pier and bank fishing is a popular pastime. It is necessary when fishing on a pier or bank to relocate from time to time to locate an area where fish are congregating. Although it is relatively easy to move along the bank with simply a fishing rod, it is difficult to relocate a number of items such as tackle boxes, coolers, and portable seats. It would be a benefit, therefore, to have a fishing accessory that could be utilized as a cooler, tackle box and portable seat and that could be relocated easily when desired.

GENERAL SUMMARY DISCUSSION OF INVENTION

It is thus an object of the invention to provide a fishing accessory container that includes an insulated compartment suitable for containing beverage items.

It is a further object of the invention to provide a fishing accessory container that includes tackle compartments for storing fishing tackle.

It is a still further object of the invention to provide a fishing accessory container that can be utilized as a portable seating device.

It is a still further object of the invention to provided a fishing accessory container that can be configured as a water dispenser.

It is a still further object of the invention to provide a fishing accessory container that accomplishes all or some of the above objects in combination.

Accordingly, a fishing accessory container is provided. The accessory container includes an insulated bucket defining an insulated compartment and having a carrying handle, a drain spout in fluid communication with a bottom surface of the insulated compartment, a drain plug adapted to seal the drain spout from the passage of fluids therethrough, a spigot aperture formed through a bucket sidewall providing a passage into the insulated compartment, and a bucket rim defining a bucket opening and having a rim top section and a rim edge section; first and second stackable tackle trays, at least one of the first and second tackle trays being adapted to seat on the rim top section, the other first and second stackable tackle tray being adapted to seat atop the at least one first and second tackle tray adapted to seat on the rim top section; a liquid vessel defining a liquid containment compartment accessible through a fill opening and in fluid communication with a spigot receiving fitting, the spigot receiving fitting being positioned on a vessel sidewall in a manner to allow the spigot receiving aperture to be placed in registration with the spigot aperture of the insulated bucket; a liquid vessel cap securable over the fill opening of the liquid vessel; a spigot mechanism having a insertion end adapted to pass through the spigot aperture and sealingly fit within the spigot receiving fitting of the liquid vessel in a manner to establish a fluid pathway from the liquid vessel through the spigot mechanism and a sealing plug adapted to sealingly engage a perimeter edge of the spigot aperture in a manner to seal the spigot aperture when the when the insertion end is sealing fit within the spigot receiving fitting; and a lid assembly including a lid member having a top surface and a tackle tray receiving compartment at least partially defined by a plurality of snap connector members adapted to secure the lid assembly over the tackle trays and to the insulated bucket through contact with the rim edge section, and a cushion member positionable on the top surface of the lid member.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
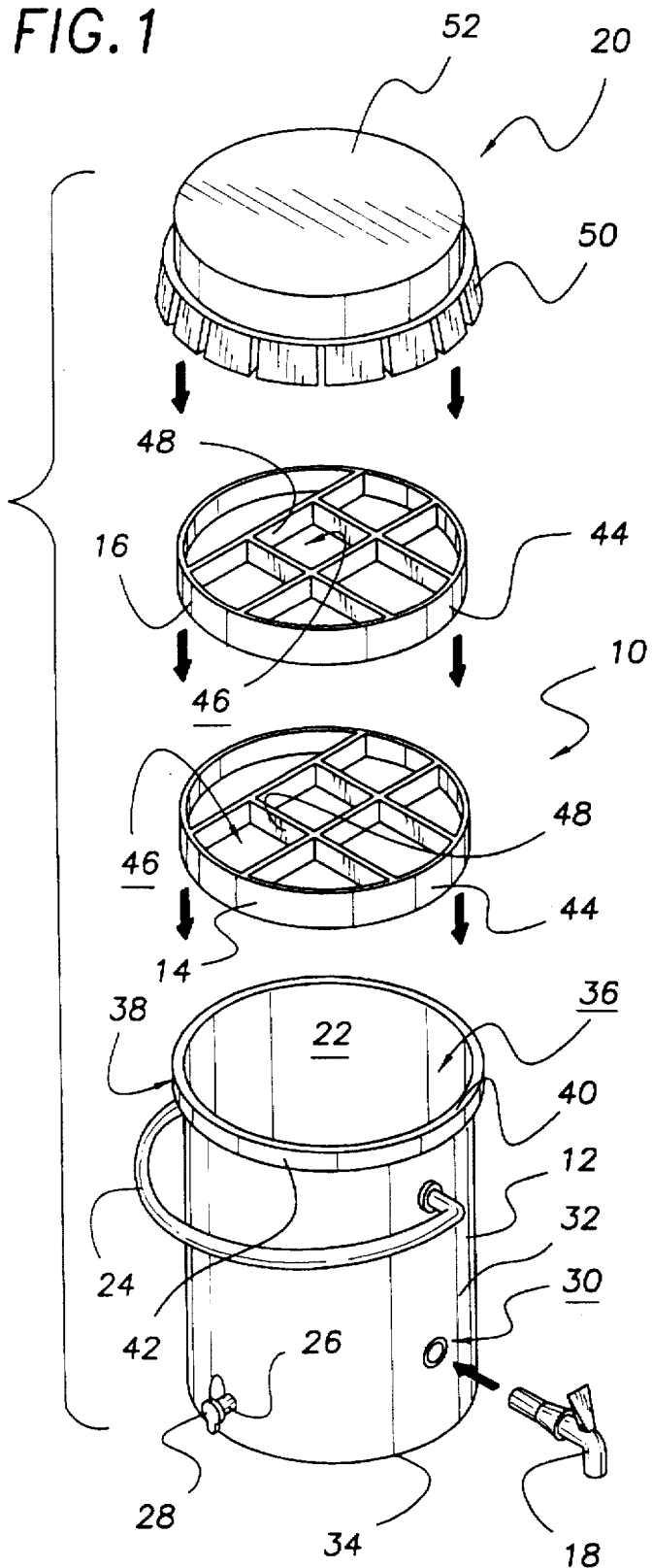
FIG. 1 is an exploded perspective view of an exemplary embodiment of the fishing accessory container of the present invention showing a pair of removable tackle trays, an insulated bucket, a lid assembly, and a removable spigot mechanism that is functionally connectable to a liquid vessel positioned within the insulated bucket and not shown in the figure.

FIG. 1 shows an exemplary embodiment of the fishing accessory container of the present invention generally designated by the numeral 10. Accessory container 10 includes an insulated bucket 12; first and second stackable tackle trays 14,16; a spigot mechanism 18; a lid assembly, generally designated by the numeral 20; and a liquid vessel 21 (shown in FIGS. 2 and 3), a liquid vessel cap 23 (shown in FIGS. 2 and 3), and a drinking cup 25 (shown in FIGS. 2 and 3).

Insulated bucket 12 is a five gallon plastic bucket having an insulated compartment 22 that is defined by an insulated layer 27 secured within insulated bucket 12 (FIGS. 2, 3) and a carrying handle 24. A drain spout 26 is provided at the bottom of insulated bucket 12 that is in fluid communication with a bottom surface of insulated compartment 22. A drain plug 28 is secured to drain spout 26 with a flexible tab and is provided to seal drain spout 26 from the passage of fluids therethrough. A spigot aperture 30 is provided through a bucket sidewall 32 about eight (8") inches from the bottom 34 of insulated bucket 12 and into insulated compartment 22. A bucket opening 36 is formed at the top of insulated bucket 12 and defined by a bucket rim generally designated by the numeral 38. Bucket rim 38 includes a rim top section 40 that is substantially parallel to the bottom of insulated bucket 12 and a rim edge section 42 that extends downward from rim top section 40 towards bottom 34 of insulated bucket 12.

In this embodiment, first and second stackable tackle trays 14,16 are identical, molded plastic, flat bottomed, circular trays having about one and one-half (1½") inch high and one-quarter (¼") inch thick sidewalls 44. Sidewalls 44 are sufficiently thick to support the weight of an person seated on lid assembly 20. Compartments 46 are formed by compartment walls 48 to allow for separate storage of a variety of fishing tackle such as hooks, lures, weights etc. Tackle trays 14,16 have flat bottoms to allow them to be stacked atop each other and placed onto rim top section 40.

Figure 1A:
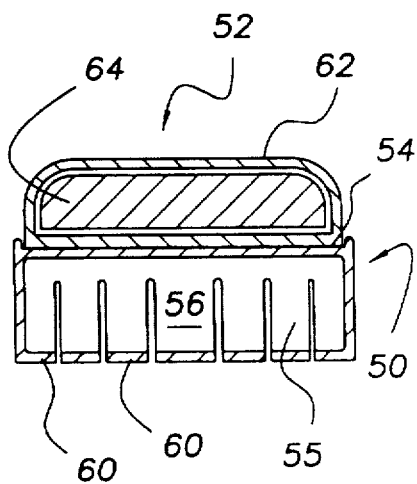
FIG. 1A is a cross section view through the middle of the lid assembly showing the snap connector members, the padded cushion member and the cushion retaining lip.

Lid assembly 20 includes a lid member 50 and a cushion member 52. With reference to FIG. 1A, lid member 50 includes a top surface 54 having a plurality of snap connector members 55 extending therefrom to form a tackle tray receiving compartment 56 that is sized to receive therein first and second tackle trays 14,16. A securing lip 60 extends inwardly from the distal end of each snap connector member 55 that engages the rim edge section 42 and secures lid member 50 in place over first and second tackle trays 14,16 and to insulated bucket 12. Cushion member 52 includes a waterproof outer cover 62 enclosing a foam cushion 64. In this embodiment, cushion member 52 is adhesively secured to top surface 54 of lid member 50.

Figure 2:
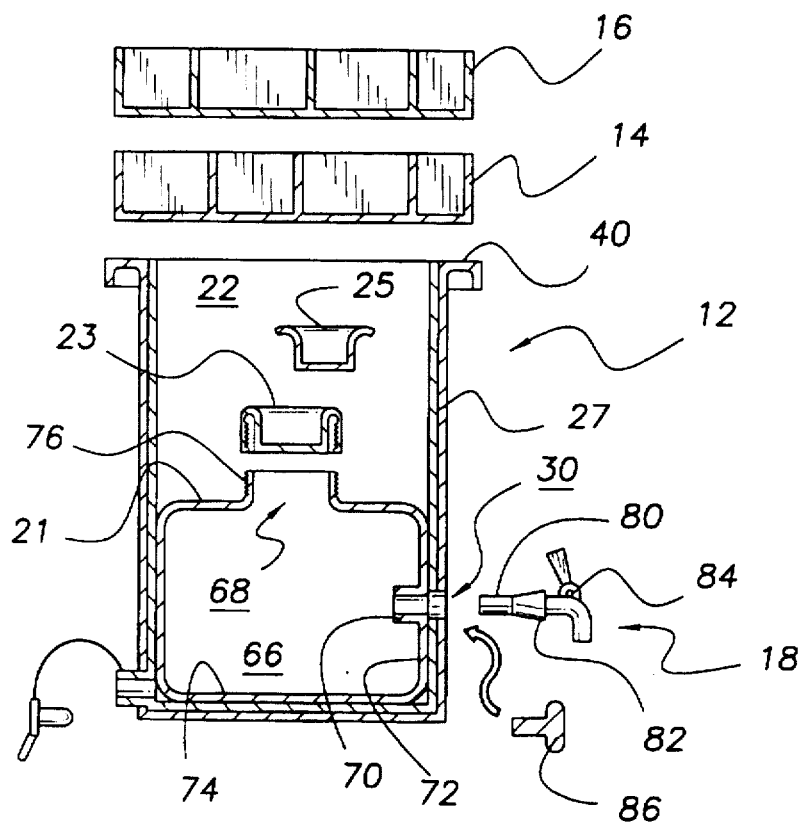
FIG. 2 is a cross sectional view of the bucket member; the two tackle trays; the liquid vessel showing the fill opening, and the spigot receiving fitting, the removable cap and the drinking cup; the drain spout and attached drain plug; the spigot aperture; the spigot mechanism; and an optional spigot aperture plug that is used to seal the spigot aperture when the spigot mechanism is not used.

FIG. 2 is a cross sectional view of insulated bucket 12 with first and second tackle trays 14,16 stacked atop rim top section 40. Liquid vessel 21, liquid vessel cap 23, and drinking cup 25 are also shown positioned within insulated compartment 22. Liquid vessel 21 includes a liquid containment compartment 66 accessible through a fill opening 68 and in fluid communication with a spigot receiving fitting 70. Spigot receiving fitting 70 is positioned through a vessel sidewall 72 about seven and one-half (7½") inches from vessel bottom 74 so that spigot receiving aperture 70 is in registration with spigot aperture 30 when liquid vessel 21 is positioned at the bottom of insulated chamber 22.

Liquid vessel cap 23 is threadably securable to the threaded peripheral edge 76 of fill opening 68. A cup depression 78 is provided in the center of liquid vessel cap 23 to receive and hold drinking cup 25. In this embodiment liquid vessel 21, liquid vessel cap 23, and drinking cup 25 are injection molded from plastic.

Spigot mechanism 18 has an insertion end 80 that is adapted to pass through spigot aperture 30 and sealingly fit within spigot receiving fitting 70 of liquid vessel 21. A conical shaped sealing plug 82 is provided between insertion end 80 and a spigot valve 84. Sealing plug 82 sealingly engages a perimeter edge of spigot aperture 30 in a manner to seal spigot aperture 30 when insertion end 80 is sealing fit within spigot receiving fitting 70. Also shown in the figure is an optional spigot aperture plug 86. Spigot aperture plug 86 is used to seal spigot aperture 30 when spigot mechanism 18 is not used.

Figure 3:
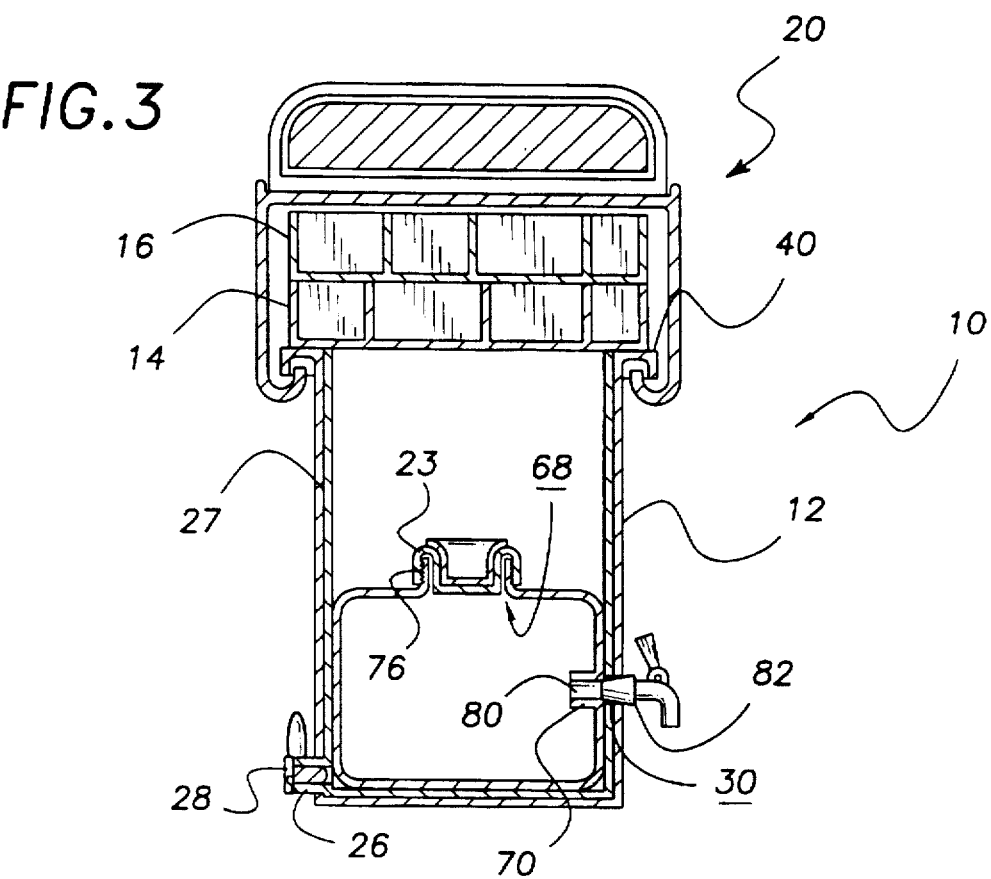
FIG. 3 is a cross sectional view of the fishing accessory container of FIG. 1 with the spigot mechanism inserted through the spigot aperture and into the spigot receiving fitting of the liquid vessel, the vessel cap secured over the fill opening, the drinking cup stored within the vessel cap, the first and second tackle trays stacked atop the insulated bucket rim, and the snap connector members snapped over the rim edge of the insulated bucket rim.

FIG. 3 is a cross sectional view showing fishing accessory container 10 fully assembled with first and second tackle trays 14,16 positioned atop rim top section 40; lid assembly 20 secured to insulated bucket 12; insertion end 80 sealing fit within spigot receiving fitting 70; sealing plug 82 sealingly installed within spigot aperture 30; drain plug 28 installed within drain spout 26; and liquid vessel cap 23 threaded onto the threaded peripheral edge 76 of fill opening 68.

It can be seen from the preceding description that a fishing accessory container has been provided that includes an insulated compartment suitable for containing beverage items; that includes tackle compartments for storing fishing tackle; that can be utilized as a portable seating device; and that can be configured as a water dispenser.

It is noted that the embodiment of the fishing accessory container described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fishing accessory container comprising:

an insulated bucket defining an insulated compartment and having a carrying handle, a spigot aperture formed through a bucket sidewall providing a passage into said insulated compartment, and a bucket rim defining a bucket opening and having a rim top section and a rim edge section;

a first tackle tray having compartments formed therein and a tray bottom surface adapted to seat on said rim top section;

a liquid vessel defining a liquid containment compartment accessible through a fill opening and in fluid communication with a spigot receiving fitting, said spigot receiving fitting being positioned on a vessel sidewall in a manner to allow said spigot receiving aperture to be placed in registration with said spigot aperture of said insulated bucket;

a liquid vessel cap securable over said fill opening of said liquid vessel;

a spigot mechanism having a insertion end adapted to pass through said spigot aperture and sealingly fit within said spigot receiving fitting of said liquid vessel in a manner to establish a fluid pathway from said liquid vessel through said spigot mechanism and a sealing plug adapted to sealingly engage a perimeter edge of said spigot aperture in a manner to seal said spigot aperture when said insertion end is sealing fit within said spigot receiving fitting; and a lid assembly including a lid member having a top surface and a tackle tray receiving compartment at least partially defined by a plurality of snap connector members adapted to secure said lid assembly over said first tackle tray and to said insulated bucket through contact with said rim edge section, and a cushion member positionable on said top surface of said lid member.

2. The fishing accessory container of claim 1, wherein:

said insulated bucket further includes a drain spout in fluid communication with a bottom surface of said insulated compartment; and said fishing accessory container further includes a drain plug adapted to seal said drain spout from said passage of fluids therethrough.

3. The fishing accessory container of claim 1, further including:

a second stackable tackle tray having a second tray bottom surface adapted to sit atop said first tackle tray; and wherein:

said tackle tray receiving compartment is of sufficient size to receive therein said first and second tackle trays.

4. The fishing accessory container of claim 1 further including:

a spigot aperture plug adapted to sealingly fit within said spigot aperture.

5. The fishing accessory container of claim 1 further including:

a drinking cup; and wherein:
    said vessel cap is adapted to receive and store therein said drinking cup.

6. The fishing accessory container of claim 2, further including:

a second stackable tackle tray having a second tray bottom surface adapted to sit atop said first tackle tray; and wherein:
    said tackle tray receiving compartment is of sufficient size to receive therein said first and second tackle trays.

7. The fishing accessory container of claim 2 further including:

a spigot aperture plug adapted to sealingly fit within said spigot aperture.

8. The fishing accessory container of claim 2 further including:

a drinking cup; and wherein:
    said vessel cap is adapted to receive and store therein said drinking cup.

9. The fishing accessory container of claim 6 further including:

a spigot aperture plug adapted to sealingly fit within said spigot aperture.

10. The fishing accessory container of claim 6 further including:

a drinking cup; and wherein:
    said vessel cap is adapted to receive and store therein said drinking cup.

11. The fishing accessory container of claim 9 further including:

a drinking cup; and wherein:
    said vessel cap is adapted to receive and store therein said drinking cup.

12. The fishing accessory container of claim 3 further including:

a spigot aperture plug adapted to sealingly fit within said spigot aperture.

13. The fishing accessory container of claim 3 further including:

a drinking cup; and wherein:
    said vessel cap is adapted to receive and store therein said drinking cup.

14. The fishing accessory container of claim 12 further including:

a drinking cup; and wherein:
    said vessel cap is adapted to receive and store therein said drinking cup.

15. The fishing accessory container of claim 4 further including:

a drinking cup; and wherein:
    said vessel cap is adapted to receive and store therein said drinking cup.

* * * * *